US008781608B2

(12) United States Patent
Seem et al.

(10) Patent No.: US 8,781,608 B2
(45) Date of Patent: Jul. 15, 2014

(54) SYSTEMS AND METHODS FOR IMPROVED START-UP IN FEEDBACK CONTROLLERS

(75) Inventors: John E. Seem, Glendale, WI (US); Michael H. Brandt, Hagerstown, MD (US)

(73) Assignee: Johnson Controls Technology Company, Holland, MI (US)

( * ) Notice: Subject to any disclaimer, the term of this patent is extended or adjusted under 35 U.S.C. 154(b) by 957 days.

(21) Appl. No.: 12/847,436

(22) Filed: Jul. 30, 2010

(65) Prior Publication Data

US 2011/0029100 A1 Feb. 3, 2011

Related U.S. Application Data

(60) Provisional application No. 61/230,542, filed on Jul. 31, 2009.

(51) Int. Cl.
*G05B 13/02* (2006.01)

(52) U.S. Cl.
CPC .................................... *G05B 13/02* (2013.01)
USPC .......................................... 700/37; 375/233

(58) Field of Classification Search
CPC ..................................................... G05B 13/02
USPC ........................................... 700/37; 375/233
See application file for complete search history.

(56) References Cited

U.S. PATENT DOCUMENTS 5,355,305 A 10/1994 Seem et al.
5,414,640 A 5/1995 Seem
5,506,768 A 4/1996 Seem et al.
5,555,195 A 9/1996 Jensen et al.
5,568,377 A 10/1996 Seem et al.
5,682,329 A 10/1997 Seem et al.
5,791,408 A 8/1998 Seem
5,867,384 A 2/1999 Drees et al.
6,006,142 A 12/1999 Seem et al.
6,122,605 A 9/2000 Drees et al.
6,219,590 B1 4/2001 Bernaden, III et al.
6,223,544 B1 5/2001 Seem
6,296,193 B1 10/2001 West et al.
6,369,716 B1 4/2002 Abbas et al.
6,389,331 B1 5/2002 Jensen et al.
6,408,228 B1 6/2002 Seem et al.
6,415,617 B1 7/2002 Seem
6,477,439 B1 11/2002 Bernaden, III et al.
6,594,554 B1 7/2003 Seem et al.
6,816,811 B2 11/2004 Seem
6,862,540 B1 3/2005 Welch et al.
6,937,909 B2 8/2005 Seem
7,031,880 B1 4/2006 Seem et al.
7,120,193 B2 * 10/2006 Ibragimov et al. ............ 375/233
7,124,637 B2 10/2006 Singhal et al.
7,496,472 B2 2/2009 Seem
7,729,882 B2 6/2010 Seem
7,827,813 B2 11/2010 Seem
8,027,742 B2 9/2011 Seem et al.

(Continued)

*Primary Examiner* — Tejal Gami
(74) *Attorney, Agent, or Firm* — Foley & Lardner LLP

(57) ABSTRACT

A system for controlling start-up of a feedback controller includes a memory device and a processing circuit. The processing circuit is configured to receive a gain parameter from the feedback controller and to store the gain parameter in the memory device. The processing circuit is further configured to multiply the stored gain parameter and to cause the feedback controller to use the multiplied gain parameter in response to a determination that the feedback controller has restarted.

20 Claims, 5 Drawing Sheets

(56) References Cited

U.S. PATENT DOCUMENTS

| | | | |
|---|---|---|---|
| 8,096,140 B2 | 1/2012 | Seem | |
| 8,200,344 B2 | 6/2012 | Li et al. | |
| 8,200,345 B2 | 6/2012 | Li et al. | |
| 2003/0101009 A1 | 5/2003 | Seem | |
| 2007/0088532 A1* | 4/2007 | Alvarez et al. | 703/2 |
| 2008/0179408 A1 | 7/2008 | Seem | |
| 2008/0277486 A1 | 11/2008 | Seem et al. | |
| 2009/0065596 A1 | 3/2009 | Seem et al. | |
| 2010/0324741 A1 | 12/2010 | House et al. | |
| 2011/0056224 A1 | 3/2011 | Seem | |
| 2011/0276180 A1 | 11/2011 | Seem | |
| 2011/0276182 A1 | 11/2011 | Seem et al. | |
| 2011/0320045 A1 | 12/2011 | Salsbury et al. | |
| 2012/0083926 A1 | 4/2012 | Seem | |

* cited by examiner

SYSTEMS AND METHODS FOR IMPROVED START-UP IN FEEDBACK CONTROLLERS

CROSS-REFERENCE TO RELATED APPLICATIONS

The present application claims the benefit of U.S. Provisional Application No. 61/230,542, filed Jul. 31, 2009, the entirety of which is hereby incorporated by reference.

BACKGROUND

The present disclosure generally relates to the field of feedback controllers.

Feedback controllers are used to control variable devices such as valves, pumps, and dampers in control systems or processes. The object of such controllers is to control the device in a way that maintains a controlled variable (e.g., temperature, humidity, flow rate, pressure, etc.) at a desired setpoint. Many feedback controllers respond to feedback based on one or more control parameters. A common control parameter used in feedback algorithms is proportional gain (i.e., the proportional term, the gain, etc.)—a value that is used by a feedback algorithm to determine the magnitude of the adjustment to the controlled signal given the error signal. For example, when provided the same error signal, a feedback algorithm with a high gain generally results in a large adjustment to the controlled signal while a small gain generally results in a small adjustment to the controlled signal. In addition to the proportional gain, other control parameters such as an integral term or a derivative term are often used by feedback algorithms (e.g., in proportional plus integral (PI) control algorithms, in proportional-integral-derivative (PID) control algorithms, etc.).

In dynamic systems (e.g., where conditions outside of the control loop are affecting the controlled variable or where an aspect of the control loop is variably imperfect), the optimal control parameters for the feedback algorithm are often also dynamic. Accordingly, some feedback controllers or feedback algorithms are periodically tuned (e.g., manually, automatically) based on observed historical behavior of the system. Other feedback controllers or feedback algorithms include adaptive tuning algorithms that automatically adjust the control parameters during normal operation of the feedback algorithm. Such adaptive tuning algorithms can provide for improved performance relative to tuning algorithms that run only periodically.

SUMMARY

One embodiment of the present invention relates to a system for controlling start-up of a feedback controller. The system includes a memory device and a processing circuit configured to receive a gain parameter from the feedback controller and to store the gain parameter in the memory device. The processing circuit is configured to multiply the stored gain parameter and to cause the feedback controller to use the multiplied gain parameter in response to a determination by the processing circuit that the feedback controller has restarted.

Another embodiment relates to a method for controlling start-up of a feedback controller. The method includes receiving, at a processing circuit, a gain parameter from the feedback controller. The method further includes storing the gain parameter in a memory device and using the processing circuit to multiply the stored gain parameter. The method yet further includes determining that the feedback controller has restarted and, in response to the determination that the feedback controller has restarted, causing the feedback controller to use the multiplied gain parameter.

Another embodiment relates to a system for controlling start-up of a feedback controller. The system includes means for receiving a gain parameter from the feedback controller and means for storing the gain parameter in the memory device. The system further includes means for multiplying the gain parameter and means for determining that the feedback controller has restarted. The system also includes means for causing the feedback controller to use the multiplied gain parameter in response to the determination that the feedback controller has restarted.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
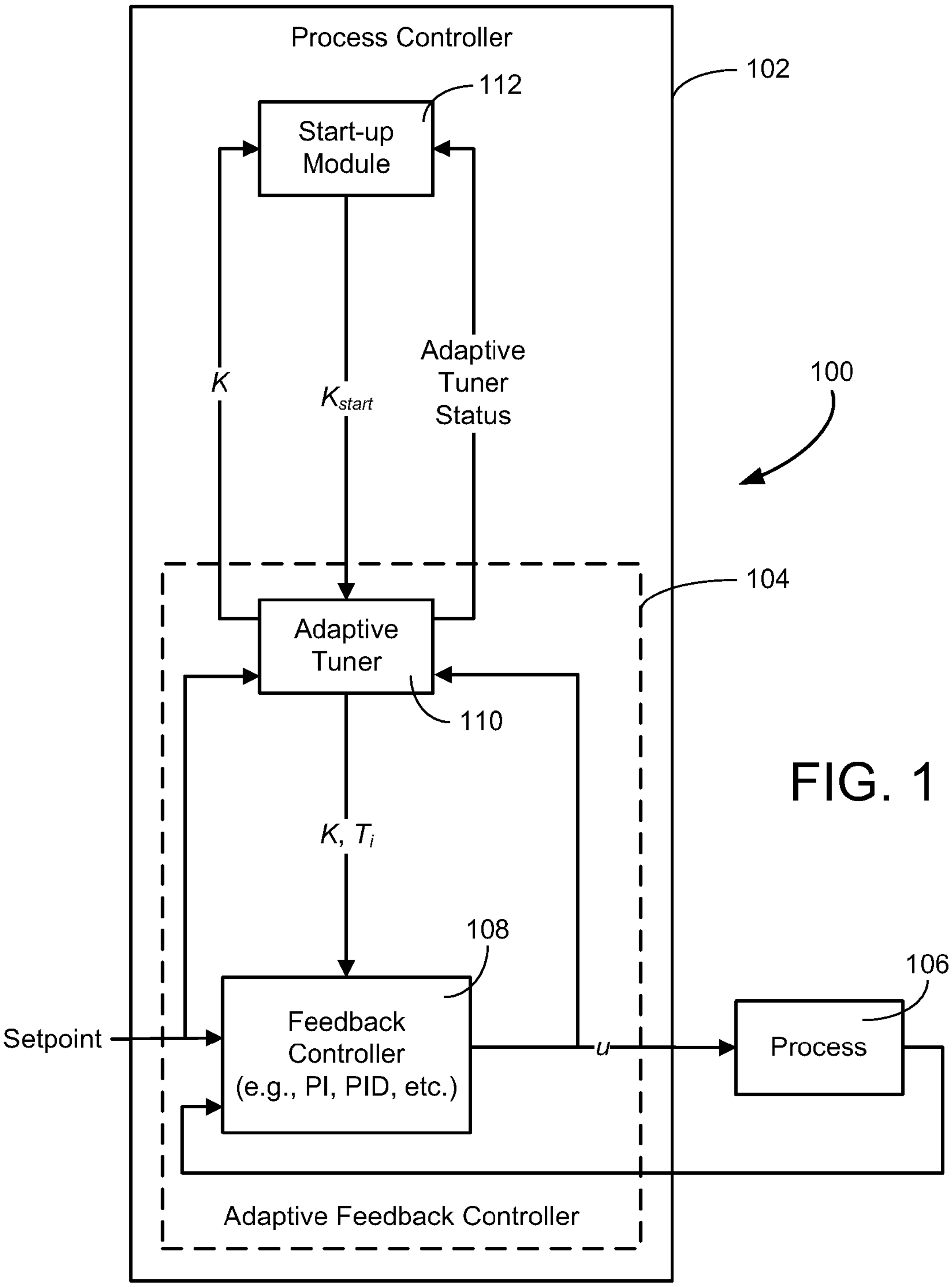
FIG. 1 is a block diagram of a control system for adaptive feedback controller start-up, according to an exemplary embodiment.

Before turning to the figures, which illustrate the exemplary embodiments in detail, it should be understood that the disclosure is not limited to the details or methodology set forth in the description or illustrated in the figures. It should also be understood that the terminology is for the purpose of description only and should not be regarded as limiting.

In some applications of adaptive feedback controllers, Applicants have observed that the adaptive feedback controller or the process served by the adaptive feedback controller is only periodically active. For example, in some HVAC applications including an adaptive feedback-controlled process, users will choose to "turn off" or "shut down" the process (e.g., at night or on weekends). These shut downs inevitably lead to startups resulting in patterns of active control sessions separated by periods of inactivity. During the inactivity, environmental and system conditions can change dramatically. Further, even if environmental or system conditions have not changed dramatically, when a control session is first started, components of the control system may operate differently than during normal or steady state operation. Particularly, Applicants have observed that during startup of an adaptive feedback controlled process, a large load disturbance is often present which a relatively low normal gain (which may be appropriate when the system stabilizes) may fail to address properly (e.g., quickly enough). This failure may result in problems ranging from slow performance to more severe system failures that may occur if the adaptive routine reacts too aggressively to the large "startup" load disturbance. Start-up problems may also exist in fixed gain feedback controllers where the gain that is appropriate for steady state control results in sub-optimal process start-up.

Referring generally to the Figures, systems and processes for controlling the start-up of a feedback controller are shown and described. In some embodiments of such a process, the process includes receiving a gain parameter from the feedback controller and storing the gain parameter in memory. The stored gain parameter is then multiplied. In response to a determination that the feedback controller has restarted, the feedback controller is caused to use the multiplied gain parameter.

Applying gain that is some multiple of a steady state control session gain during startup of a new feedback controller session can result in improved speed, accuracy, or stability of the system until the startup is completed. When startup has completed, the multiplication is discontinued and the feedback controller is allowed to utilize a fixed or adaptively determined gain. In embodiments where the feedback controller is an adaptive feedback controller having an adaptive tuner, when the multiplication is discontinued the adaptive tuner is allowed to seek its own gain parameter. In embodiments where the feedback controller is a fixed gain feedback controller, the gain may be reduced in a controlled fashion to the normal fixed gain value, the multiplier may be removed in a multi-step process, or the gain may otherwise be calculated and set by the system after the startup period.

Referring now to FIG. 1, a block diagram of a control system 100 for improved adaptive feedback controller startup is shown, according to an exemplary embodiment. Control system 100 is shown to include a collection of components referred to as a process controller 102. Process controller 102 generally outputs a control signal u to a process 106. Process controller 102 is generally configured to output a control signal u that is calculated to cause a controlled variable of process 106 to approach a setpoint (e.g., a setpoint established by a user, a setpoint received from an upstream controller, etc.).

In the embodiment of FIG. 1, process controller 102 is shown to include adaptive feedback controller 104. Adaptive feedback controller 104 includes a feedback controller 108 and an adaptive tuner 110. Feedback controller 108 uses a feedback signal input to adjust the control signal u provided to process 106 and to adaptive tuner 110. The setpoint is also shown as received by adaptive tuner 110. Adaptive tuner 110 uses the setpoint and control signal u to determine and provide updated control parameters to feedback controller 108. In the embodiment shown in FIG. 1, these control parameters include proportional gain (K) and integral time ($T_1$). In other embodiments of adaptive tuner 110, only the proportional gain may be provided to feedback controller 108. In yet other adaptive tuners 110, additional or other control parameters may be provided to feedback controller (e.g., a derivative time for a PID controller).

Process controller 102 is further shown to include start-up module 112. Start-up module 112 is in communication with adaptive feedback controller 104 and is generally configured to provide a start-up gain parameter to the adaptive feedback controller 104 in response to a determination that the adaptive feedback controller 104 has restarted.

With particular reference to the embodiment illustrated in FIG. 1, start-up module 112 is configured to receive the proportional gain K from adaptive tuner 110 as well as a signal representative of adaptive tuner status (e.g., tuner inactive, system in active session startup, etc.). Start-up module 112 is configured to store the proportional gain values when received (e.g., in non-volatile memory). Accordingly, after adaptive feedback controller 104 is shut-down, deactivated, or otherwise cycled, start-up module 112 can recall the proportional gain from a previous control session for use during the start-up of adaptive feedback controller 104. Upon determining that adaptive feedback controller 104 is restarting, cycling back up, or otherwise beginning a new session (e.g., via the adaptive tuner status signal), start-up module 112 is configured to multiply the stored proportional gain from the previous session by some multiplier (e.g., 1.5, 2, 3, etc.). Startup module 112 provides the result of the multiplication to the adaptive tuner as $K_{start}$. Adaptive tuner 110 is configured to use $K_{start}$ as the initial value for the proportional gain K provided to feedback controller 108 when feedback controller 108 and adaptive tuner 110 are starting up. In embodiments where the multiplier is greater than one, adaptive feedback controller 104 may advantageously reach a steady state after start-up in less time than would otherwise take adaptive feedback controller 104. Without start-up module 112 dictating a steady-state gain or some multiple thereof, some adaptive tuners 110 can de-tune in response to start-up oscillation or abnormalities.

In some embodiments, adaptive tuner 110 may be configured to hold the gain at $K_{start}$ for a period of time before returning to a normal proportional gain or allowing tuning to determine new adaptively calculated gains. In another embodiment, start-up module 112 controls how long adaptive tuner 110 holds the gain at $K_{start}$. In yet other embodiments start-up module 112 provides $K_{start}$ to adaptive tuner 110 as the starting point for adaptive tuner 110's tuning activity but does not hold or force $K_{start}$ for any longer than needed for adaptive tuner 110 to use $K_{start}$ as a basis for tuning. Therefore, adaptive tuner 110 may begin seeking new optimal values for K shortly after receiving $K_{start}$. In another embodiment, start-up module 112 is configured to cause the feedback controller to use $K_{start}$ for a predetermined period of time before beginning a multi-step process of reducing the multiplier to one.

Adaptive feedback controller 104 may be as described in U.S. Pat. No. 6,937,909, titled "Pattern Recognition Adaptive Controller," filed Jul. 2, 2003. In other embodiments, adaptive feedback controller 104 and/or adaptive tuner 110 may be a model reference adaptive controller ("MRAC"), a pattern recognition adaptive controller, a self-tuning controller, or any other type of adaptive feedback controller. In yet other embodiments, the feedback controller may not be an adaptive feedback controller but may also benefit from the systems and methods for start-up gain control disclosed herein.

Figure 2:
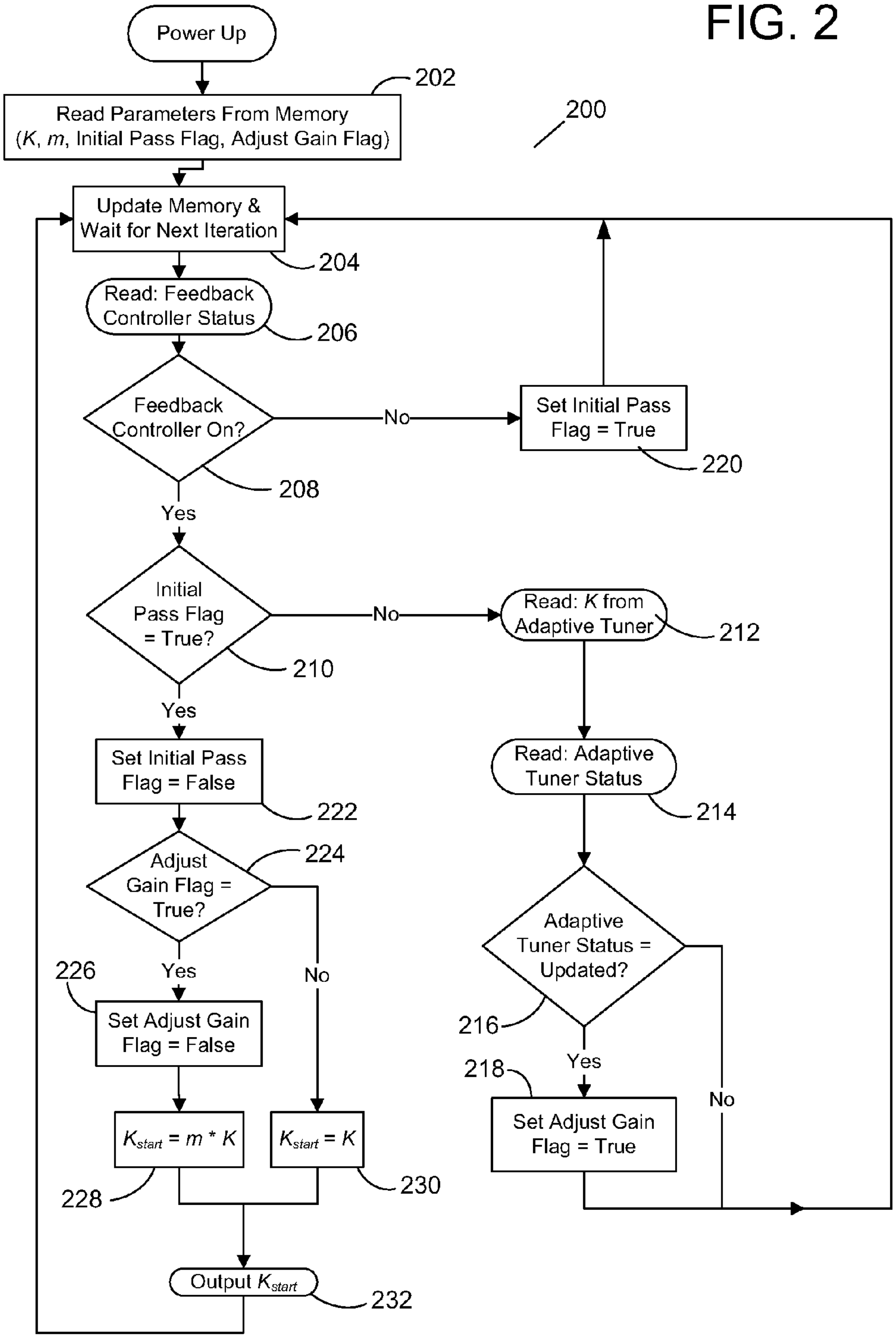
FIG. 2 is a flow chart of a process for improved adaptive feedback controller start-up, according to an exemplary embodiment.

Referring now to FIG. 2, a flow chart of a process 200 for improved adaptive feedback controller startup is shown, according to an exemplary embodiment. The process illustrated in FIG. 2 may be completed by, for example, the start-up module shown in FIG. 1. In other embodiments the process illustrated in FIG. 2 may be integrated with the main control loop for an adaptive tuner and/or for a feedback controller.

FIG. 2 is shown to include reading a number of initial parameters from memory (step 202). The parameters read in step 202 are shown to include K (a gain from a previous session of the adaptive tuner or the feedback controller), m (the gain multiplier selected for the feedback control and process system), an initial pass flag, and an adjust gain flag. Different initial parameters may be read or initialized in different embodiments of the system.

Once the loop beginning with "Update Memory & Wait for Next Iteration" (step 204) is entered, the start-up module will read or receive a status from the feedback controller (step 206). In the embodiment shown in FIG. 1, the adaptive tuner receives a message "Adapter Tuner Status" from the adaptive tuner. In an exemplary embodiment, the start-up module is configured to determine the status of the feedback controller without any modification being made to the feedback controller or without any extra control signal being output from the feedback controller. For example, if current values of K are no longer being received (e.g., from an adaptive feedback module, an adaptive feedback controller) then the start-up module may determine that the feedback controller is not "on" (e.g., has been commanded to turn off, turned off due to power failure, turned off due to an alarm state, has entered into a standby or inactive state, etc.). In other exemplary embodiments, the start-up module may inspect values for the control output u from the feedback controller to determine if the feedback controller is active. In yet other exemplary embodiments, other methods for determining the feedback controller status are used. In the embodiment shown in FIG. 2, step 208 checks for whether the feedback controller is "on" or "off."

If the feedback controller reports a status of "off," the initial pass flag is set to true at step 220 in anticipation of the feedback controller restarting at some future time. Process 200 then returns to step 204 and the next iteration of the loop is begun.

Step 206 will eventually receive an indication that the feedback controller is "on" (step 208). The feedback controller may report an "on" condition when its power has been restored, as a part of a start-up routine within the feedback controller's logic, in response to a state machine activating the feedback controller, or in response to another occurrence or condition.

When the feedback controller is "on" at step 208, process 200 will then determine whether the initial pass flag is equal to true (step 210). If the initial pass flag is determined to be true, the start-up module resets the initial pass flag to be false (step 222). The initial pass flag should always be "true" when the feedback controller is first returning from an "off" state due to the variable set of step 220. The start-up module then continues with the gain adjustment logic when the initial pass flag is true at step 222. At step 224 the start-up module determines whether the adjust gain flag is true or false. If the adjust gain flag is true, $K_{start}$ is set to equal K (a gain from a previous session of the adaptive tuner) multiplied by m, the gain multiplier (e.g., ⅓, 2, 3, etc.) (step 228). $K_{start}$ is then provided to the adaptive tuner (step 232) and the process begins another iteration at step 204.

When the process iterates at step 204, the feedback controller is on at step 208, and the initial pass flag is false, the previous gain K and the adaptive tuner status are read (or received) from the adaptive tuner (steps 212 and 214). In other words, when the feedback controller is on and normally operational, the start-up module iterates through a process that checks the adaptive tuner status and stores an updated value for K in memory. In the exemplary embodiment of FIG. 2, the adaptive tuner status variable is set to "updated" by another process. The other process may be a control signal of the adaptive tuner that reports whether the adaptive tuner is operating normally or in a steady state. Accordingly, and as is illustrated by steps 216 and 218, the adjust gain flag is only set to true when the adaptive tuner status indicates normal operation via an "updated" status. If the adaptive tuner status does indicate normal operation via an "updated" status, the start-up module does not multiply a received gain K due to steps 224 and 230.

In some embodiments, the adaptive tuner is configured to only report an "updated" status when the adaptive tuner is operating in a steady state and without any proportional gain multiplication. If step 224 does not see an adjust gain flag equal to true, an unmultiplied gain K is used rather than a multiplied gain m*K. Such a precaution may prevent a run-away multiplication situation where multiplied K values continue to be multiplied before falling back to steady state values for K (e.g., the adaptive tuner is fully controlling K and effects of a previous multiplication are no longer significant).

Figure 3:
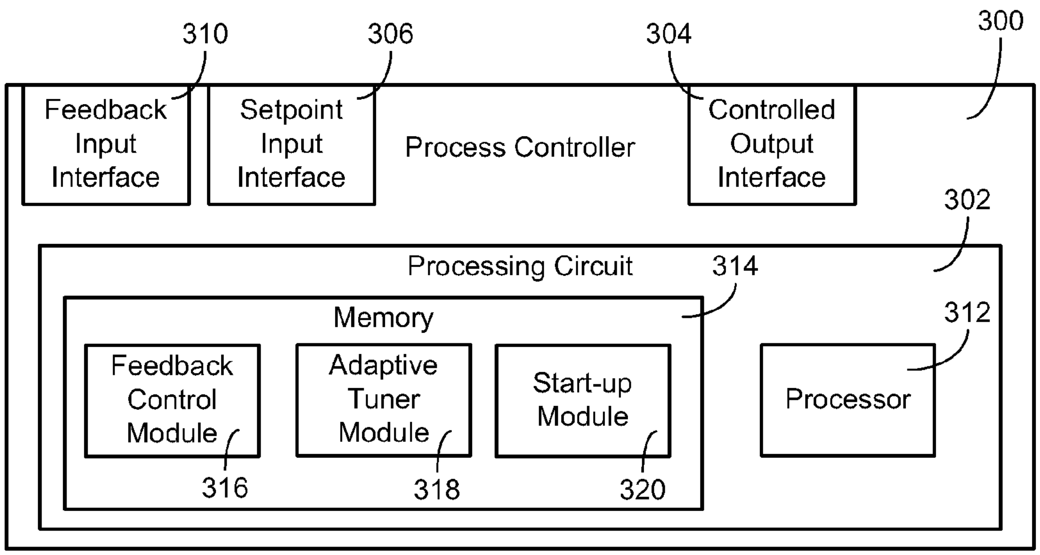
FIG. 3 is a block diagram of a processor-based controller having a start-up module for an adaptive feedback controller, according to an exemplary embodiment.

The process controller 102 shown in FIG. 1 can be multiple separate circuits, boards or modules, or can be relatively integrated such as shown in the processor-based controller of FIG. 3. Referring now to the processor-based controller of FIG. 3, process controller 300 is shown to include a processing circuit 302. Processing circuit 302 may be a printed circuit board (PCB) upon which or to which the various electronics components of controller 300 are connected. For example, processor 312 and memory 314 may communicate via conductive traces of processing circuit 302. Processing circuit 302 may be implemented on a flexible substrate, a rigid substrate, via point-to-point wiring, via distributed circuits or circuit boards, or via other circuitry or circuit technology.

Processor 312 may be responsible for executing software programs or routines such as application programs and system programs to provide computing and processing operations. Processor 312 can include or be implemented as a general purpose processor, a chip multiprocessor, a dedicated processor, an embedded processor, a media processor, a field programmable gate array (FPGA), a programmable logic device (PLD), or other processing device in alternative embodiments. System programs assist in the running of process controller 300. Systems programs may be directly responsible for controlling, integrating, and managing the individual hardware components of process controller 300. Examples of system programs may include, for example, an operating system (OS), device drivers, programming tools, utility programs, compilers, software libraries, application programming interfaces, a graphical user interface environment, a username/password protection program, security programs, communications programs, and so forth. Systems programs may be or include any suitable OS (e.g., a Microsoft Windows OS, a Linux OS, a JavaOS, an Apple OS, etc.). The application programs may include computer code (e.g., executable code, script code, source code, object code) configured to cause the processor to complete the various logic activities described herein (e.g., the flow chart steps shown in certain Figures and described below).

Memory 314 may be coupled to processor 312 and configured to store one or more software programs (e.g., application programs, systems programs, etc.) to be executed by processors 312. Memory 314 may be implemented using any machine readable or computer-readable media capable of storing data such as volatile memory, removable or non-removable memory, erasable or non-erasable memory, writable or re-writable memory, and so forth. Examples of machine readable storage media may include, without limitation, random-access memory (RAM), dynamic RAM (DRAM), read-only memory (ROM), flash memory, or any other type of media suitable for storing information. Although memory 314 is shown as being separate from processor 312, in various embodiments some portion or the entire memory may be included on the same integrated circuit as the processor. Alternatively, some portion or the entire memory may be disposed on an integrated circuit or other medium (e.g., hard disk drive) external to the integrated circuit of the processor.

In FIG. 3, memory 314 is shown as including modules 316-320. Each of modules 316-320 may be application programs or routines for completing the logic described for each component herein. For example, feedback control module 316 may be configured to use feedback received at feedback input interface 310 and a setpoint received at setpoint input interface 306 to calculate and output a controlled output (e.g., via controlled output interface 304). Adaptive tuner module 318 may be configured to adaptively update parameters for feedback control module 316. Adaptive tuner module 318, for example, may use a pattern recognition routine to calculate updated parameters for feedback control module 316. Start-up module 320 may be configured to cause processor 312 to execute process 200 shown in FIG. 2. Any other or additional start-up module embodiment or start-up logic described herein may be implemented in or by start-up module 320.

Interfaces 304, 306, and 310 may be or include any number of jacks, wire terminals, wire ports, wireless antennas, or other communications interfaces for communicating information. Interfaces 304, 306, and 310 may be the same type of devices or different types of devices. For example, feedback input interface 310 may be configured to receive an analog feedback signal from a controlled process component while setpoint input interface is configured to receive a digital setpoint signal from an upstream supervisory controller or user input device. Controlled output interface 304 may be a digital output (e.g., an optical digital interface) configured to provide a digital control signal to a controlled process component. In other embodiments controlled output interface 304 is configured to provide an analog output signal. In some embodiments the interfaces can be joined as one or two interfaces rather than three separate interfaces. For example, setpoint input interface 306 and feedback input interface 310 may be combined as one Ethernet interface configured to receive network communications from a supervisory controller. In other words, the supervisory controller may provide both the setpoint and process feedback via an Ethernet network. In such an embodiment controlled output interface 304 may be specialized for the controlled process component. In yet other embodiments controlled output interface 304 can be another standardized communications interface for communicating data or control signals. Interfaces 304, 306, and 310 can include communications electronics (e.g., receivers, transmitters, transceivers, modulators, demodulators, filters, communications processors, communication logic modules, buffers, decoders, encoders, encryptors, amplifiers, etc.) configured to provide or facilitate the communication of the signals described herein.

While FIG. 3 illustrates an embodiment where feedback control module 316, adaptive tuner module 318, and start-up module 320 are integrated within a single processor-based controller, in other embodiments modules 316-320 may each have their own controller (processor based or not). In yet other embodiments two of the modules may be together in a processor-based controller while the third module is in another controller (processor based or not). For example, in some embodiments it may not be possible or desirable to modify the feedback controller with new logic and adaptive tuner module 318 and start-up module 320 may be added to the system in a second controller. In yet other embodiments feedback control module 316 and adaptive tuner module 318 are integrated or combined within a single controller while start-up module 320 is provided as an add-on module or controller. In any of such embodiments, the combined set of components that completes the start-up logic described herein is considered to be a single processing circuit configured to provide the start-up features or advantages described herein.

Figure 4:
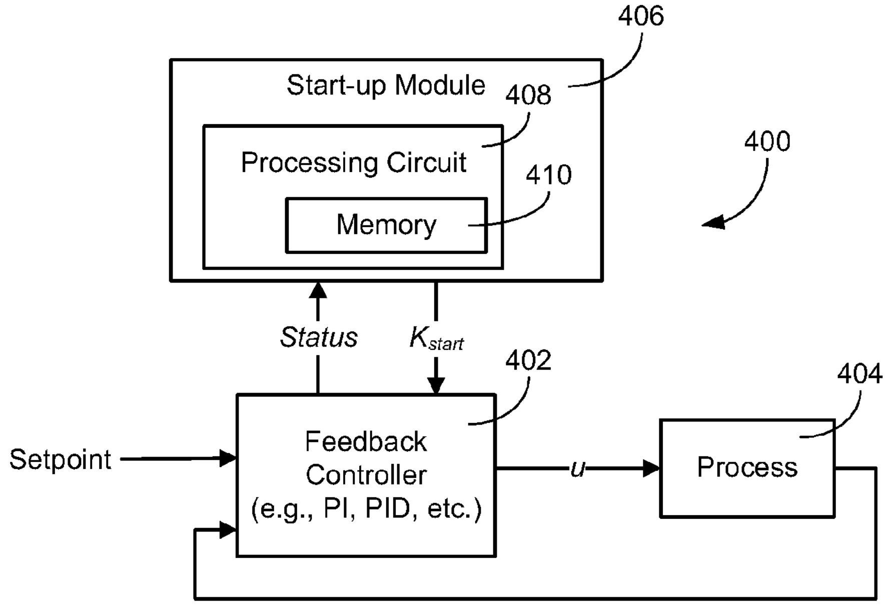
FIG. 4 is a block diagram of a system for controlling start-up of a fixed gain feedback controller, according to another exemplary embodiment.

Referring now to FIG. 4, a system 400 for controlling start-up of a fixed gain feedback controller 402 is shown, according to an exemplary embodiment. In system 400, an adaptive tuner is not present and feedback controller 402 does not automatically change its gain parameters. Instead feedback controller 402 is configured to allow a gain parameter to be set electronically (e.g., feedback controller 402 receives and responds to a command to change a gain parameter). Feedback controller 402 provides a control signal u to process 404 and a status signal to start-up module 406. Start-up module 406 includes a processing circuit 408 (which may include any number of processors, discrete logic components or other electronics circuitry) and memory 410. Memory 410 may be similar to the memory described above or may be another type of memory device. Processing circuit 408 is configured to monitor the status signal received from feedback controller 402 to determine when feedback controller 402 has restarted. In response to a determination that feedback controller 402 has restarted, processing circuit 408 is configured to multiply a stored gain parameter by a multiplier and to cause feedback controller 402 to use the multiplied gain parameter $K_{start}$ for a period of time (e.g., one second, ten seconds, five minutes, etc.). Once the period of time has expired, processing circuit 408 may remove the multiplied gain parameter and immediately allow feedback controller 402 to return to its normal gain parameter. In other embodiments, processing circuit 408 is configured to remove the gain in a multi-step process after the period of time has expired. For example, if the gain multiple is initially equal to three, when the period of time expires, processing circuit 408 may step down to one and one half for a second period of time, and then one and one quarter for a third period of time before completely removing the multiple (i.e., returning the multiple to one).

Figure 5:
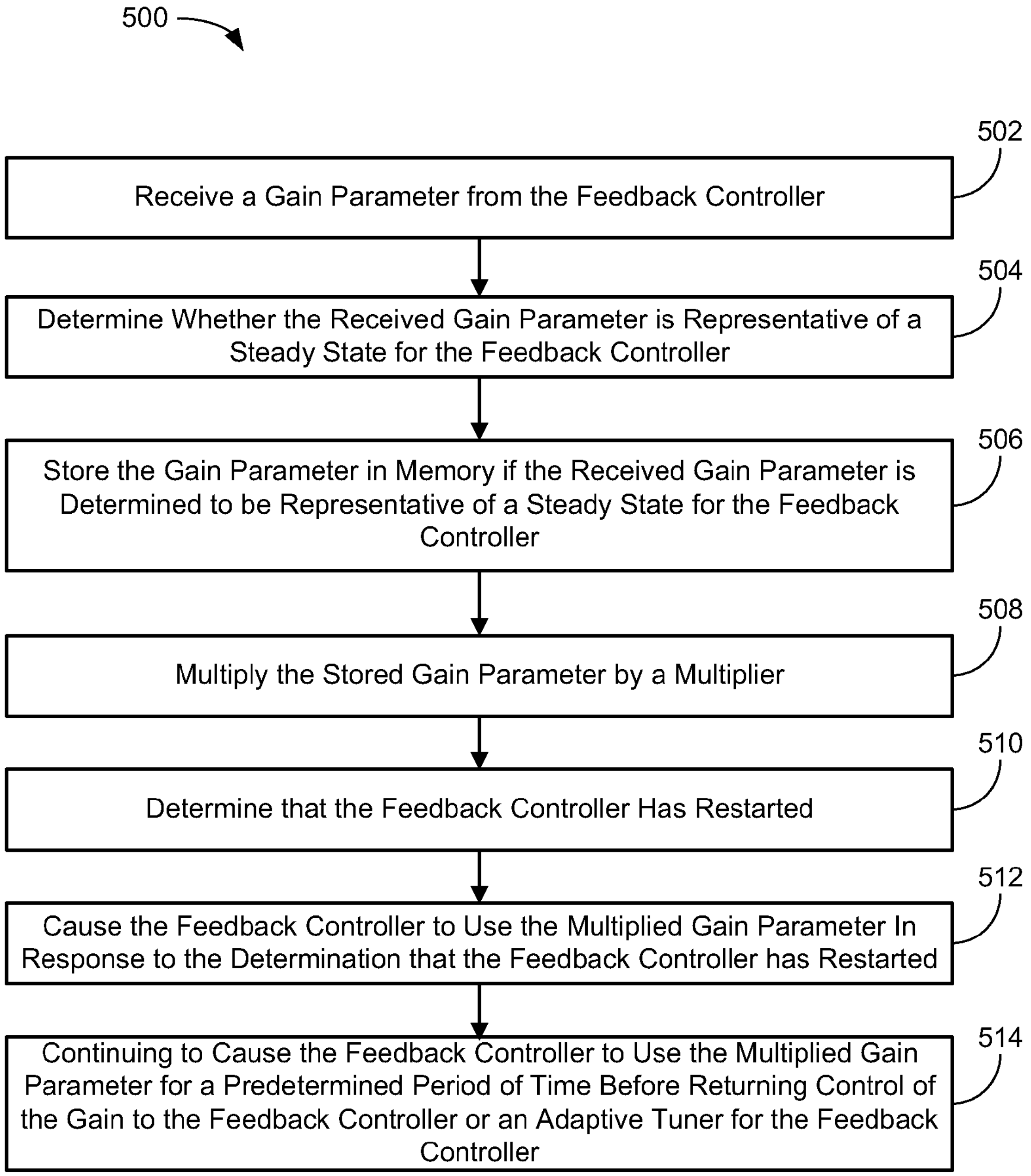
FIG. 5 is a flow chart of a process for controlling start-up of a feedback controller, according to an exemplary embodiment.

Referring now to FIG. 5, a process 500 for controlling start-up of a feedback controller is shown, according to an exemplary embodiment. Process 500 may be implemented by, for example, the start-up modules of FIGS. 1 and 3. Process 500 is shown to include receiving a gain parameter from the feedback controller (step 502). In the exemplary embodiment of FIG. 1, the step of receiving the gain parameter from the feedback controller includes receiving a proportional gain parameter from an adaptive tuner of an adaptive feedback controller. The gain parameter may be received at a processing circuit of a start-up module.

Process 500 further includes determining whether the received gain parameter is representative of a steady state for the feedback controller (step 504). Step 504 can include comparing the received gain parameter to a steady state criterion or criteria. The criterion may be, for example, a determination that the received gain parameter is within a particular range or percentage from a moving average. In other embodiments, the adaptive tuner can provide a signal to the start-up module when the adaptive tuner makes a steady state determination or is normally updating the gain parameter. In such embodiments, the presence of such a signal may be the criterion for a determination that the received gain parameter is representative of a steady state for the feedback controller.

The gain parameter is stored in memory in response to a determination that the received gain parameter is determined to be representative of a steady state for the feedback controller (step 506). Storing the gain in memory may include updating a gain variable to be used in a multiplication. In step 508, the stored gain parameter is multiplied by a multiplier. The multiplier may be preselected by a user or determined based on some other variable (e.g., a time of year, a time of day, a sensed variable, the initial size of the error signal in the feedback controller, etc.). While the gain parameter is multiplied by a multiplier in preferred embodiments, in other embodiments the gain parameter is increased by a constant value (i.e., stepped-up) or otherwise increased. In an exemplary embodiment, the multiplier is greater than one. Such a multiplier may be selected to improve the response time of the feedback controller during a start-up process of the feedback controller or its adaptive tuner. In other words, the multiplier may be selected to appropriately exaggerate the feedback controller's reaction to an error signal during start-up. In alternative embodiments the multiplier can be less than one to reduce the feedback controller's response to its error signal.

At some point between step 508 and 510, the start-up module may determine that the feedback controller has been turned off, deactivated, or otherwise shut down. At step 510, the start-up module determines that the feedback controller has eventually restarted. In response to a determination that the feedback controller has restarted, the start-up module causes the feedback controller to use the multiplied gain parameter (step 512). Causing the feedback controller to use the multiplied gain parameter can include, for example, communicating a new gain parameter to an adaptive tuner in a manner that is expected to override the adaptive tuner's normal calculation. In embodiments where the start-up module, feedback controller, and adaptive tuner are all integrated within the same processor-based controller, causing the feedback controller to use the multiplied gain parameter can include setting the gain variable in memory to the multiplied value. The start-up module can continue to cause the feedback controller to use the multiplied gain parameter for a predetermined period of time before returning control of the gain to the feedback controller or an adaptive tuner for the feedback controller (step 514).

Figure 6:
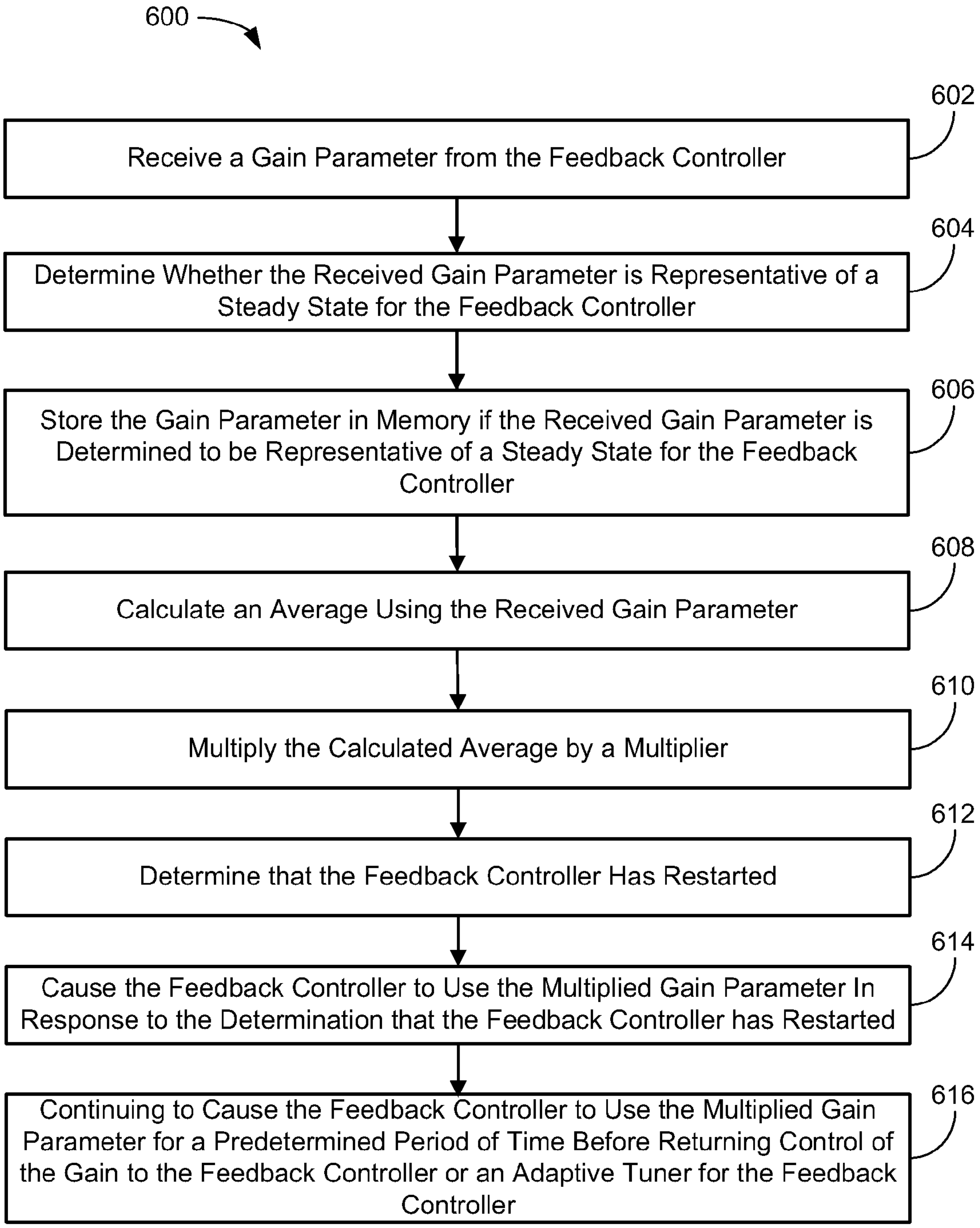
FIG. 6 is a flow chart of a process for controlling start-up of a feedback controller, according to another exemplary embodiment.

Referring now to FIG. 6, another process 600 for controlling start-up of a feedback controller is shown, according to another exemplary embodiment. Process 600 includes receiving a gain parameter from the feedback controller (step 602) and determining whether the received gain parameter is representative of a steady state for the feedback controller (step 604). In response to a determination that the received gain parameter is representative of a steady state for the feedback controller, a start-up module can store the gain parameter in memory (step 606).

Process 600 further includes calculating an average using the received gain parameter (step 608). Calculating the average can include calculating a moving average such as an exponentially weighted moving average. Due to step 604, the average calculated in step 608 may only be updated if the received gain is a steady state gain. In other exemplary embodiments, another filter or other criteria may be used to determine whether to use a received gain in calculating an average or new gain. In other words, process 600 may additionally include a step of refraining from using the received gain parameter to calculate the moving average if the received gain parameter does not meet a steady state criterion or another criterion. In other exemplary embodiments, gain parameters received just after start-up of a feedback controller are ignored and are not used to calculate an average gain. Such a step may include waiting a period of time or a number of cycles after a detected feedback controller start-up before adding new gain parameters received from the feedback controller to an average calculation.

In step 610, the calculated average is multiplied by a multiplier. After a shut-down or other deactivation of the feedback controller, the start-up module will eventually determine that the feedback controller has restarted (step 612). Process 600 then includes causing the feedback controller to use the multiplied gain parameter in response to the determination that the feedback controller has restarted (step 614). Process 600 also includes continuing to cause the feedback controller to use the multiplied gain parameter for a predetermined period of time before returning control of the gain to the feedback controller or an adaptive tuner for the feedback controller (step 616).

Referring generally to the Figures, the above systems and methods may be applied to many different types of control loops. In one example of a control loop that may utilize the above systems and methods, the process is a coolant loop having a variable speed drive on a coolant pump. The feedback controller has a target coolant temperature and therefore the controlled variable is sensed coolant temperature. The output or one of the outputs from the feedback controller is a valve position for a mixing valve that regulates the flow of coolant to a radiator. The start-up activity described above will be applied when ever the variable speed drive transitions from a stopped state to a running state.

Another exemplary process of a control loop that may utilize the above systems and methods is a liquid injection control loop where refrigerant is directly piped into compressor screws to prevent internal parts of the compressor from overheating. The feedback controller has a target discharge gas temperature of the compressor and therefore the controlled variable is sensed discharge gas temperature. The feedback controller's output is the position of a regulating valve which manages the flow of refrigerant into the compressor. The start-up activity described above is applied when the compressor transitions from a stopped state to a running state.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The invention claimed is:

1. A system for controlling start-up of a feedback controller, the system comprising:

a memory device;

a processing circuit configured to receive a gain parameter from the feedback controller and to store the gain parameter in the memory device such that the gain parameter is non-transitory and available for use during a start-up of the feedback controller;

wherein the processing circuit is configured to multiply the stored non-transitory gain parameter by a multiplier; and wherein the processing circuit is configured to cause the feedback controller to use the multiplied gain parameter in response to a determination by the processing circuit that the feedback controller has restarted.

2. The system of claim 1, wherein the feedback controller is an adaptive feedback controller.

3. The system of claim 2, wherein the processing circuit is further configured to cause the adaptive feedback controller to use the multiplied gain parameter for a predetermined period of time before returning control of the gain to an adaptive tuner of the adaptive feedback controller.

4. The system of claim 1, wherein the processing circuit is configured to cause the feedback controller to use the multiplied gain parameter for a predetermined period of time before beginning a multi-step process of reducing the multiplier to one.

5. The system of claim 1, wherein the feedback controller is a fixed gain feedback controller and wherein the gain is a proportional gain for the feedback controller.

6. The system of claim 1, wherein the processing circuit is configured to determine whether the received gain parameter is representative of a steady state for the feedback controller.

7. The system of claim 6, wherein the processing circuit is configured to store the gain parameter in the memory device only when the processing circuit determines that the gain parameter is representative of a steady state for the feedback controller.

8. The system of claim 1, wherein the processing circuit is configured to use the received gain parameter to calculate an average gain parameter and to use the calculated average gain parameter in the multiplication.

9. The system of claim 8, further comprising:

refraining from using the received gain parameter to update the average when the received gain parameter does not meet a steady state criterion.

10. A method for controlling start-up of a feedback controller, the method comprising:

receiving, at a processing circuit, a gain parameter from the feedback controller;

storing the gain parameter in a memory device such that the gain parameter is non-transitory and available for use during a start-up of the feedback controller;

using the processing circuit to multiply the stored non-transitory gain parameter by a multiplier;

determining that the feedback controller has restarted; and in response to the determination that the feedback controller has restarted, causing the feedback controller to use the multiplied gain parameter.

11. The method of claim 10, wherein the feedback controller is an adaptive feedback controller.

12. The method of claim 11, further comprising:

causing the feedback controller to use the multiplied gain parameter for a predetermined period of time before returning control of the gain to an adaptive tuner of the adaptive feedback controller.

13. The method of claim 10, wherein the feedback controller is a fixed gain feedback controller.

14. The method of claim 10, further comprising:

determining whether the received gain parameter is representative of a steady state for the feedback controller.

15. The method of claim 14, further comprising:

only storing the gain parameter in the memory device in response to a determination that the gain parameter is representative of a steady state for the feedback controller.

16. The method of claim 10, further comprising:

calculating an average gain parameter using the received gain parameter and previously received gain parameters; and using the calculated average gain parameter in the multiplication.

17. The method of claim 10, further comprising:

calculating a moving average using the received gain parameter and previously received gain parameters; and using the calculated moving average in the multiplication.

18. The method of claim 17, wherein the moving average is an exponentially weighted moving average.

19. The method of claim 17, further comprising:

refraining from using the received gain parameter to calculate the moving average when the received gain parameter does not meet a steady state criterion.

20. A system for controlling start-up of a feedback controller, the system comprising:

means for receiving a gain parameter from the feedback controller;

means for storing the gain parameter in a memory device such that the gain parameter is non-transitory and available for use during a start-up of the feedback controller;

means for multiplying the stored non-transitory gain parameter;

means for determining that the feedback controller has restarted; and means for causing the feedback controller to use the multiplied gain parameter in response to a determination that the feedback controller has restarted.

* * * * *